US005865899A

United States Patent [19]

[11] Patent Number: 5,865,899

[45] Date of Patent: *Feb. 2, 1999

Theoleyre et al.

[54] PROCESS FOR REFINING A RAW SUGAR, PARTICULARY RAW SUGAR FROM THE SUGAR CANE SUGAR INDUSTRY

[75] Inventors: Marc-André Theoleyre, Paris; Stanislas Baudoin, Elizabeth-Ville, both of France

[73] Assignee: Applexion, Epone, France

[ * ] Notice: This patent issued on a continued prosecution application filed under 37 CFR 1.53(d), and is subject to the twenty year patent term provisions of 35 U.S.C. 154(a)(2).

[21] Appl. No.: 654,811

[22] Filed: May 29, 1996

Related U.S. Application Data

[63] Continuation of Ser. No. 274,728, Jul. 18, 1994, abandoned.

[30] Foreign Application Priority Data

Jul. 19, 1993 [FR] France .................................... 93 08826

[51] Int. Cl.[6] ................................ C13D 1/08; C13D 3/00; C13F 1/02; B01D 21/00

[52] U.S. Cl. ................................ 127/42; 127/43; 127/44; 127/48; 127/55; 127/56; 127/58; 210/304; 210/705

[58] Field of Search ................................ 127/42, 43, 44, 127/48, 55, 56, 58; 210/304, 705

[56] References Cited

U.S. PATENT DOCUMENTS

| | | | |
|---|---|---|---|
| 2,047,218 | 7/1936 | Merrill | 106/62 |
| 3,166,442 | 1/1965 | Duke | 127/48 |
| 3,563,799 | 2/1971 | Zievers et al. | 127/42 |
| 3,781,174 | 12/1973 | Nishijima et al. | 127/42 |
| 3,799,806 | 3/1974 | Madsen | 127/48 |

FOREIGN PATENT DOCUMENTS

| | | | |
|---|---|---|---|
| 624560 | 6/1992 | Australia | C13F 1/14 |
| 4249000 | 9/1992 | Japan | C13J 1/02 |
| 2090861 | 7/1982 | United Kingdom | C13D 3/00 |

OTHER PUBLICATIONS

The Merck Index, 11th Edition, Merck & Co., Inc., p. 316 (1989) (Month not available).

*Primary Examiner*—Deborah Jones
*Assistant Examiner*—Patricia L. Hailey
*Attorney, Agent, or Firm*—McDermott Will & Emery

[57] ABSTRACT

A process for refining a raw sugar, particularly raw sugar from the sugar cane sugar industry, characterized in that it comprises the steps of:

(a) remelting of the raw sugar for obtaining a raw sugar syrup, (b) carbonatation or phosphatation of said raw sugar syrup, and (c) tangential microfiltration and/or tangential ultrafiltration of the raw sugar syrup, which has been subjected to carbonatation or phosphatation.

The process is completed by the steps of:

(d) decolorization of the sugar syrup resulting from step (c), and (e) crystallization and/or demineralization of the sugar syrup resulting from step (d).

8 Claims, 1 Drawing Sheet

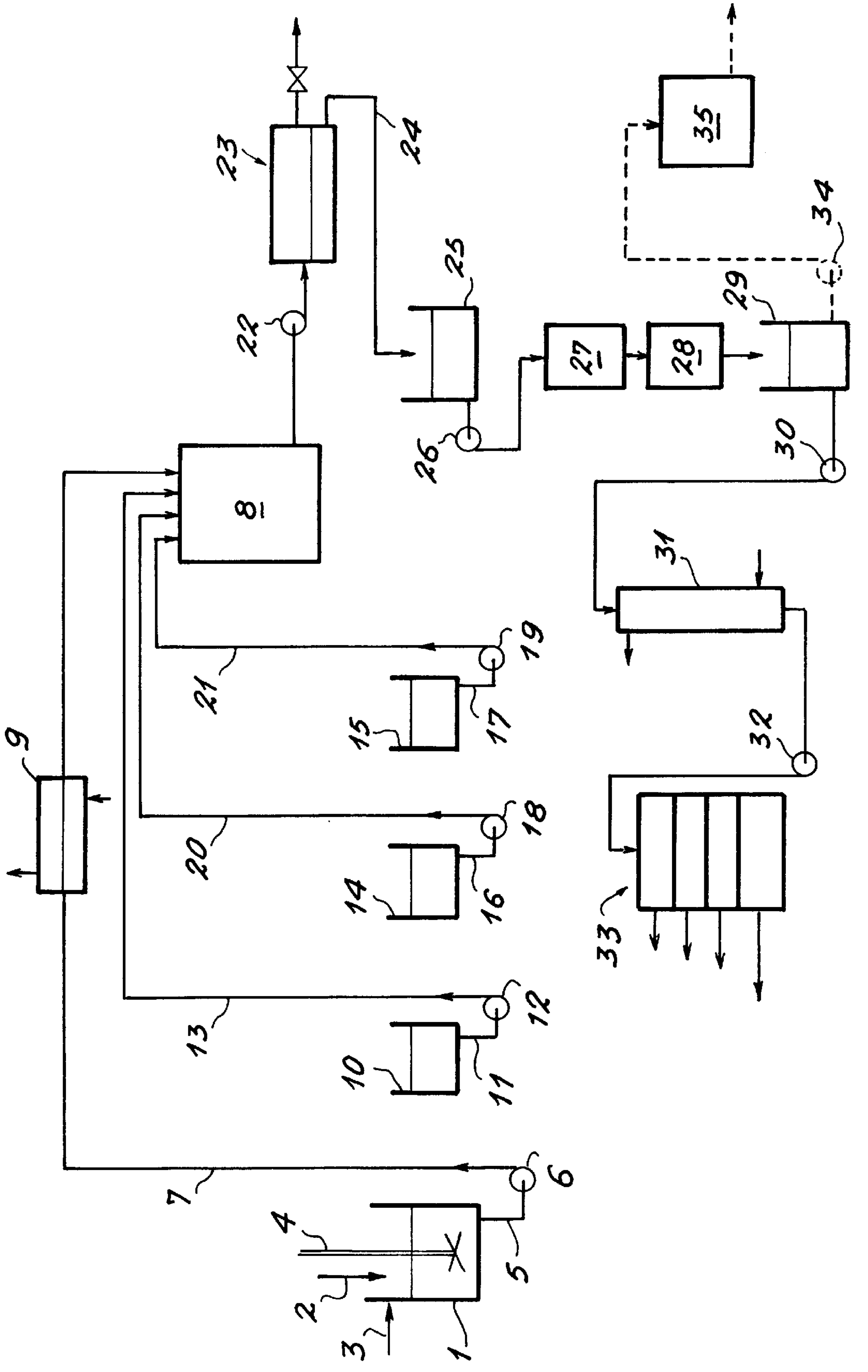
1
2
3
4
5
6
7
8
9
10
11
12
13
14
15
16
17
18
19
20
21
22
23
24
25
26
27
28
29
30
31
32
33
34
35

PROCESS FOR REFINING A RAW SUGAR, PARTICULARY RAW SUGAR FROM THE SUGAR CANE SUGAR INDUSTRY

This is a continuation application of application Ser. No. 08/274,728 filed Jul. 18, 1994 now abandoned.

BACKGROUND OF THE INVENTION

1. Field of the Invention

This invention relates to a process for refining a raw sugar, particularly raw sugar from the sugar cane sugar industry.

2. Description of Art

Such known processes comprise first a refining of the raw sugar which usually consists in washing the latter with the run-off of the last crystallisation of high-grade products which dissolves the surface film of crystals which is the most charged with coloring agents. A refined sugar and a refining run-off generally containing approximately 80–85% by weight of dry matter, which is essentially composed of sugar, are thus obtained. Said run-off is then subjected to several crystallisations in the low-grade product line to obtain a raw sugar (which will be remelted with the refined sugar) and molasses. Since the concentrated refining run-off has a high coloring agent content, the crystallisation operations require very long crystallisation times and consequently make the crystallisation equipment unavailable for other operations during an appreciable period. As concerns the refined sugar (high-grade products), it is subjected to an additional purification comprising the steps of remelting, carbonatation (treatment using calcium oxide or lime milk and carbon dioxide) or phosphatation (treatment using calcium oxide or lime milk and phosphoric acid), front filtration or clarification, decolorization and crystallisation.

It thus will be seen that, in the aggregate, these known processes are unsatisfactory economically, essentially because of the tedious nature and high cost of the refining run-off crystallisation operations and production of low-grade products (raw sugar and colored molasses) at the end of said run-off purification.

SUMMARY OF THE INVENTION

The object of this invention is to remedy the disadvantages of the processes known previously, and it therefore proposes a process for refining a raw sugar, particularly raw sugar from the sugar cane sugar industry, characterized in that it comprises the steps of:

(a) remelting of the raw sugar for obtaining a raw sugar syrup, (b) carbonatation or phosphatation of said raw sugar syrup, and (c) tangential microfiltration and/or tangential ultrafiltration of the raw sugar syrup, which has been subjected to carbonatation or phosphatation.

DETAILED DESCRIPTION

As will be observed, this process is free of any tedious and costly preminimary step of raw sugar refining; this was made possible quite unexpectedly, according to the invention, by the use of the well known tangential microfiltration and/or tangential ultrafiltration technique, which is a simple, flexible, high-efficiency, quick and well controlled technique having a much lower operating cost than the above-mentioned refining operation. In other words, the present invention makes it possible to dispense with a tedious and costly operation by using a simple operation, which is little time and energy consuming.

It should be noted that the process according to the invention may further comprise a flocculation step making use of a flocculating agent, which step may be performed simultaneously with step (b) or before or after said step (b), the use of such a flocculation step permitting a very appreciable reduction in the amounts of reagents (calcium oxide or lime milk, carbon dioxide and phosphoric acid) to be used in the carbonatation or phosphatation step.

According to a preferred embodiment of the invention, the process comprises a flocculation step and a phosphatation step, in which case the calcium oxide (or lime milk), phosphoric acid and flocculating agent are used in the phosphatation and flocculation steps in an amount of 200 to 900 ppm (expressed in CaO), 200–900 ppm (expressed in pure $H_3PO_4$) and 200–900 ppm (expressed in active product) with respect to the dry matter of the raw sugar syrup, respectively.

It will be noted that the flocculating agent used in the flocculation step may particularly be formed by a cationic surfactant, especially a quaternary ammonium compound of tallow fatty acids, for example dioctadecyldimethylammonium chloride such as NORAMIUM® M2SH marketed by the French company CECA. It may also be derivatives from deacetylated chitosan poly-N-acetylglucosamine derived from chitin, such as PROFLOC® SD 340 from the Norwegian company PROTAN BIOPOLYMER.

It will be further noted that the steps of carbonatation or phosphatation, flocculation, and tangential microfiltration and/or tangential ultrafiltration will be advantageously implemented at a temperature of the order of 70° to 95° C.

Finally, it should be specified that the refining process according to the invention will be completed by a step (d) of decolorization of the sugar syrup resulting from the microfiltration and/or ultrafiltration, and by a step (e) of crystallization and/or demineralization of the sugar syrup resulting from the decolorization step for thus obtaining white crystal sugar in the case of crystallization and liquid sugar (syrup) in the case of demineralization.

BRIEF DESCRIPTION OF THE DRAWING

Other aspects and advantages of the present invention will become apparent from the following description of a preferred embodiment with reference to the accompanying drawing, the single FIGURE of which is a schematic representation of an installation for implementing the inventive process.

In this embodiment, the raw sugar to be refined is a raw sugar from a sugar cane sugar factory, said raw sugar having a dry matter (essentially saccharose) content of about 97 to 99% by weight.

After possible screening of the raw sugar to be refined, the latter is remelted, i.e. dissolved in an aqueous medium, such as a sugar aqueous solution or preferably water. The aqueous medium is at a sufficient temperature for the remelting operation to take place at a temperature of the order of 50° to 90° C., preferably of the order of 80° C.

Remelting results in the production of a raw sugar syrup, the amount of the aqueous medium used being preferably selected so that said syrup has a dry matter content of the order of 40 to 70% by weight. This remelting step is carried out in a tank 1 provided at the top thereof with a raw sugar supply 2 and a hot water supply 3. For obtaining homogeneous syrup, said tank is further provided with agitator means 4.

The raw sugar syrup resulting from the above remelting step and which usually has a coloration of 2,500–4,500 ICUMSA units (international units) and a turbidity of 3,000–4,000 ICUMSA units is then subjected to a phosphatation step in conjunction with a flocculation step. To this effect, the syrup is extracted from the base of tank 1 through a conduit 5 connected to the intake of a circulating pump 6 having its delivery continued by a conduit 7, which opens to the upper part of a phosphatation/flocculation tank 8. If necessary, the syrup is reheated, for example through indirect heat exchange in a heat exchanger 9 arranged in the path of the syrup between tank 1 and tank 8. Said heat exchanger is selected to raise the temperature of the syrup to a sufficient value so that the temperature prevailing within tank 8 is of the order of 70° C.

A flocculating agent is then introduced into tank 8. More specifically, said flocculating agent is fed to the upper part of tank 8 from a flocculating agent tank 10, which is formed in its base with an extraction conduit 11 connected to the intake of a circulating pump 12 having its delivery connected to a conduit 13 leading to tank 8. Tank 10 may be provided with heating means (not shown), such as an inner jacket where a hot fluid, for example hot water or steam, is circulating, said heating means allowing, in case when the flocculating agent is solid or pasty at ambient temperature, to turn it into the liquid form for pumping by pump 12. Thus, for example, if said flocculating agent is formed by NORAMIUM® M2SH having a melting point of the order of 60° C., the heating means are arranged to raise the temperature of the flocculating agent to a value of the order of 60°–65° C. Besides, the amount of flocculating agent used is of the order of 200 to 900 ppm of active product with respect to the dry matter of the raw sugar syrup; for example, in the case of NORAMIUM® M2SH, said amount will preferably be of the order of 500 ppm of active product with respect to the dry matter of the syrup.

Subsequently, lime milk (at a concentration of 200 g/l expressed in CaO) in an amount of the order of 300 ppm expressed in CaO with respect to the dry matter of the syrup is introduced into tank 8, followed by phosphoric acid (for example, a 90% solution) until neutralization, that is approximately 250 ppm expressed in pure phosphoric acid and with respect to the dry matter of the syrup. The introduction of the lime milk and phosphoric acid into tank 8 is achieved in the same manner as for the flocculating agent, i.e. from a lime milk tank 14 and phosphoric acid tank 15, respectively, through extraction conduits 16, 17, circulating pumps 18, 19 and conduits 20, 21 connected to said pumps and leading to tank 8.

It should be added that tank 8 is provided with agitator means for performing a vigorous stirring of its contents. It should also be specified that the flocculating agent may, as an alternative, be introduced into tank 8 simultaneously with or after the lime milk and phosphoric acid, although the operating mode described above is more preferred. Under the effect of the flocculating agent, a part of the coloring agents and solid matters in suspension precipitates. A major part of the remaining coloring agents and solid matters in suspension is eliminated by the phosphatation step, as the calcium phosphate formed by the reaction between the lime milk and phosphoric acid precipitates with an occlusion of said coloring agents and matters in suspension.

After a retention time of 10 to 30 min, preferably 15 min, in tank 8, the syrup, which has been subjected to the flocculation/phosphatation is drawn off from said tank 8 by a pump 22 delivering into a tangential microfiltration or tangential ultrafiltration unit 23. If necessary, the thus drawn off syrup may be reheated so that the step in said unit 23 takes place at about 80° C. The membrane used in unit 23 may have a cut-off value of 10 nm to 1 μm (preferably of the order of 0,1 μm), the syrup flowing at a tangential velocity of the order of 1 to 8 m/s (preferably 4 to 6 m/s) and the permeate flow rate being of the order of 20 to 80 liters/hour.$m^2$ of membrane (preferably 35–50 liters/hour.$m^2$ of membrane). For the membrane, use may be made of membranes made of organic polymers or ceramic materials. Good results have been obtained with a membrane of zirconium oxide on a ceramic support, produced by the French company TECH-SEP.

The permeate from unit 23 (coloration of the order of 1,000–2,000 ICUMSA units and turbidity below 20 ICUMSA units) is conveyed through a conduit 24 to a storage tank 25, from which it is drawn off by a pump 26 to be fed to the head of a two-stage decolorization column 27, 28. Such columns are packed with a coloring agent absorbing material, such as animal black, active charcoal, or preferably with a decolorization resin; it may be a strong anionic resin in the chloride form (for example, resin IRA® 900 from Rohm and Haas). The decolorizing step in this column is preferably performed at 70°–90° C., particularly at 80° C. At the outlet of decolorizing stage 28, the decolorized syrup (coloration<400 ICUMSA units) is fed into tank 29.

Said decolorized syrup may then be changed into either crystal sugar or demineralized sugar. In the former case, the syrup is fed through a pump 30 into an evaporator 31, such as a falling float evaporator, and the concentrated syrup is then fed by a pump 32 into a crystallisation unit 33 where it undergoes several successive crystallizations (three in the example illustrated in the figure) for delivering crystal sugar and a crystallization run-off. In the latter case, the decolorized syrup is fed, through a pump 34, to tank 29 in the demineralization unit 35, which may for example be formed by a column packed with a mixture of a cationic resin in the $H^+$ form and an anionic resin in the $OH^-$ form. This resin mixed bed column may be replaced by two columns of which one is filled with a cationic resin in the $H^+$ form and the other is filled with an anionic resin in the $OH^-$ form. After the demineralization treatment, a syrup having a coloration<20 ICUMSA units is obtained.

By way of example, it will be indicated that processing under the above-mentioned conditions of a remelt syrup having a dry matter content of 50%, a coloration of 3,800 ICUMSA units and a turbidity of 2,000 ICUMSA units, results in a syrup having a coloration of 1,500 ICUMSA units and a turbidity<20 ICUMSA units at the outlet of the tangential microfiltration/tangential ultrafiltration unit, a syrup having a coloration below 400 ICUMSA units at the outlet of the decolorization unit and a crystal sugar or syrup having a coloration<20 ICUMSA units at the outlet of the crystallization or demineralization unit. This shows that the process object of the present invention provides refining performance as high as that of the conventional refining technique, but with a highly simplified implementation.

We claim:

1. A process for refining a raw sugar, comprising the steps of:

(a) remelting of the raw sugar for obtaining a raw sugar syrup;

(b) carbonatation or phosphatation of said raw sugar syrup, and (c) tangential microfiltration and/or tangential ultrafiltration of the raw sugar syrup, which has been subjected to said carbonatation or phosphatation and further comprising a step of flocculation using a flocculating agent, said step of flocculation performed simultaneously with said step (b) or before or after said step (b), wherein said raw sugar to be refined has a dry matter content of 97 to 99% by weight.

2. The process according to claim 1, wherein the flocculating agent is a quaternary ammonium compound of tallow fatty acids.

3. The process according to claim 1, wherein the flocculating agent is a deacetylated chitosan poly-N-acetylglucosamine derived from chitin.

4. The process according to claim 1, wherein said step (b) is phosphatation, comprising using calcium oxide or lime milk, phosphoric acid and flocculating agent in the phosphatation and flocculation steps in an amount of 200 to 900 ppm (expressed in CaO), 200 to 900 ppm (expressed in pure $H_3PO_4$) and 200 to 900 ppm (expressed in active product) in relation to the dry matter of the raw sugar syrup, respectively.

5. The process according to any of the preceding claims, wherein the carbonatation or phosphatation, flocculation and tangential microfiltration and/or tangential ultrafiltration steps are implemented at a temperature of 70° to 95° C.

6. The process according to claim 1, which further comprises the steps of:

(d) decolorization of the sugar syrup resulting from step (c), and (e) crystallization and/or demineralization of the sugar syrup resulting from step (d).

7. The process according to claim 1, wherein the raw sugar is remelted at a temperature of about 50° to 90° C.

8. The process according to claim 1, wherein the flocculating agent is a cationic surfactant.

* * * * *